US008949392B2

(12) United States Patent
Kanda

(10) Patent No.: US 8,949,392 B2
(45) Date of Patent: Feb. 3, 2015

(54) WORKLOAD MANAGEMENT WITH NETWORK DYNAMICS

(75) Inventor: Amit Kanda, San Jose, CA (US)

(73) Assignee: Brocade Communications Systems, Inc., San Jose, CA (US)

(*) Notice: Subject to any disclaimer, the term of this patent is extended or adjusted under 35 U.S.C. 154(b) by 639 days.

(21) Appl. No.: 12/119,457

(22) Filed: May 12, 2008

(65) Prior Publication Data

US 2009/0119396 A1 May 7, 2009

Related U.S. Application Data

(60) Provisional application No. 61/002,252, filed on Nov. 7, 2007.

(51) Int. Cl.
G06F 15/16 (2006.01)
H04Q 11/00 (2006.01)
H04L 12/801 (2013.01)
H04L 12/825 (2013.01)
H04L 5/00 (2006.01)

(52) U.S. Cl.
CPC ............ *H04Q 11/0005* (2013.01); *H04L 47/10* (2013.01); *H04L 47/11* (2013.01); *H04L 47/12* (2013.01); *H04L 47/263* (2013.01); *H04L 5/0037* (2013.01); *Y02B 60/31* (2013.01)
USPC ........... 709/223; 709/217; 709/219; 709/220; 709/221

(58) Field of Classification Search
CPC ................................ G06F 15/16; G06F 15/173
See application file for complete search history.

(56) References Cited

U.S. PATENT DOCUMENTS

| | | | | |
|---|---|---|---|---|
| 5,838,994 | A * | 11/1998 | Valizadeh | 710/56 |
| 6,446,122 | B1 * | 9/2002 | Rawat et al. | 709/224 |
| 6,580,715 | B1 * | 6/2003 | Bare | 370/396 |
| 6,836,466 | B1 * | 12/2004 | Kant et al. | 370/252 |
| 7,197,315 | B1 * | 3/2007 | Stephens et al. | 455/450 |
| 7,668,177 | B1 | 2/2010 | Trapp | |
| 2004/0267897 | A1 * | 12/2004 | Hill et al. | 709/217 |
| 2005/0234937 | A1 * | 10/2005 | Ernest et al. | 707/100 |
| 2005/0281196 | A1 * | 12/2005 | Tornetta et al. | 370/235 |
| 2006/0013135 | A1 | 1/2006 | Schmidt | |
| 2006/0092932 | A1 | 5/2006 | Ghosh | |
| 2006/0217115 | A1 * | 9/2006 | Cassett et al. | 455/423 |
| 2006/0233102 | A1 | 10/2006 | Kusumoto | |

(Continued)

OTHER PUBLICATIONS

"Service Level Agreement"—IT Services Aug. 2006 https://infotech.wsu.edu/netops/dsf/service_agreement.pdf.*

*Primary Examiner* — Randy Scott
(74) *Attorney, Agent, or Firm* — Shun Yao; Park, Vaughan, Fleming & Dowler LLP

(57) ABSTRACT

A workload management system identifies a first source device and first destination device which can be used to perform a job function. The system further communicates information about the first source device and destination device to one or more switches, and receives a set of network parameters along a data path from the first source device to the first destination device. The system then determines resources available on the first source device and/or first destination device. In addition, the system determines whether the first source device and first destination device, if used for the job function, can satisfy a set of SLAs for that job function based on the network parameters along a data path from the first source device to the first destination device and the determined resources available on the first source device and/or first destination device.

24 Claims, 6 Drawing Sheets

(56) References Cited

U.S. PATENT DOCUMENTS

2006/0236063 A1* 10/2006 Hausauer et al. ............. 711/170
2006/0251067 A1   11/2006 DeSanti
2006/0265497 A1* 11/2006 Ohata et al. ................... 709/224
2007/0083588 A1* 4/2007 Keller et al. .................. 709/202
2007/0112723 A1* 5/2007 Alvarez et al. .................... 707/2
2007/0174851 A1   7/2007 Smart
2008/0228862 A1* 9/2008 Mackey ........................ 709/203

* cited by examiner

WORKLOAD MANAGEMENT WITH NETWORK DYNAMICS

RELATED APPLICATION

This application claims the priority and benefit under 35 U.S.C. section 119 to U.S. Provisional Patent Application Ser. No. 61/002,252, entitled "Adaptive Networking Advanced Data Center Fabric Technology," filed 7 Nov. 2007.

The subject matter of this application is related to the subject matter in the following co-pending non-provisional applications:

- U.S. patent application Ser. No. 12/119,440, entitled "AUTOMATIC ADJUSTMENT OF LOGICAL CHANNELS IN A FIBRE CHANNEL NETWORK," by inventor Amit Kanda, filed 12 May 2008;
- U.S. patent application Ser. No. 12/119,436, entitled "METHOD AND SYSTEM FOR FACILITATING APPLICATION-ORIENTED QUALITY OF SERVICE IN A FIBRE CHANNEL NETWORK," by inventor Amit Kanda, filed 12 May 2008;
- U.S. patent application Ser. No. 12/119,448, entitled "METHOD AND SYSTEM FOR CONGESTION MANAGEMENT IN A FIBRE CHANNEL NETWORK," by inventor Amit Kanda, filed 12 May 2008;
- U.S. patent application Ser. No. 12/119,430, entitled "METHOD AND SYSTEM FOR FACILITATING QUALITY OF SERVICE IN EDGE DEVICES IN A FIBRE CHANNEL NETWORK," by inventor Amit Kanda, filed 12 May 2008; and
- U.S. patent application Ser. No. 11/782,894, entitled "Method and Apparatus for Determining Bandwidth-Consuming Frame Flows in a Network," by inventor Amit Kanda, filed 25 Jul. 2007;

the disclosures of which are incorporated by reference in their entirety herein.

BACKGROUND

1. Field

The present disclosure relates to storage area networks. More specifically, the present disclosure relates to a method and system for workload management with network dynamics in a storage area network.

2. Related Art

The proliferation of the Internet and e-commerce continues to fuel revolutionary changes in the network industry. Today, a significant number of transactions, from real-time stock trades to retail sales, auction bids, and credit-card payments, are conducted online. Consequently, many enterprises rely on existing storage area networks (SANs), not only to perform conventional storage functions such as data backup, but also to carry out an increasing number of egalitarian network functions such as building large server farms.

A predominant form of SAN is the Fibre Channel (FC) network. FC standards were developed based on High Performance Parallel Interface (HIPPI), a data channel standard developed by Los Alamos National Laboratory in the 1980's. HIPPI was designed as a supercomputer I/O interface with high throughput and minimal switching function. As time went on, optical fiber became cheaper and more reliable, and FC was developed as a successor to HIPPI to take advantage of the high capacity of fiber optics. FC can carry data channels including HIPPI, Small Computer Systems Interface (SCSI), and multiplexor channels used on mainframes, as well as network traffic, including IEEE 802, Internet Protocol (IP), and Asynchronous Transfer Mode (ATM) packets. Like HIPPI, the basic topology of an FC network is a star topology with a switch fabric at the center to connect inputs to outputs.

Historically, conventional network appliances (e.g., data-center servers, disk arrays, backup tape drives) mainly use an FC network to transfer large blocks of data. Therefore, FC switches provide only basic patch-panel-like functions. In the past decade, however, drastic advances occurred in almost all the network layers, ranging from the physical transmission media, computer hardware and architecture, to operating system (OS) and application software.

For example, a single-wavelength channel in an optical fiber can provide 10 Gbps of transmission capacity. With wavelength-division-multiplexing (WDM) technology, a single strand of fiber can provide 40, 80, or 160 Gbps aggregate capacity. Meanwhile, computer hardware is becoming progressively cheaper and faster. Expensive high-end servers can now be readily replaced by a farm of many smaller, cheaper, and equally fast computers. In addition, OS technologies, such as virtual machines, have unleashed the power of fast hardware and provide an unprecedented versatile computing environment.

As a result of these technological advances, one often faces a much more heterogeneous, versatile, and dynamic network environment. Virtualization and workload management are essential technologies for maximizing the scalability, availability, and value on high-end computing systems interconnected by FC switches. An enterprise user would want to dynamically manage the workload among different machines and/or virtual servers. However, conventional FC network equipment does not provide information about the network dynamics. As a result, it has been difficult, if not impossible, for the workload management mechanism to take into consideration the network dynamics when allocating workload.

SUMMARY

One embodiment of the present invention provides a system that facilitates workload management. During operation, the system identifies a first source device and first destination device which can be used to perform a job function. The system further communicates information about the first source device and destination device to one or more switches or edge devices coupled to the switches. In response, the system receives a set of network parameters along a data path from the first source device to the first destination device. The system then determines resources available on the first source device and/or first destination device. In addition, the system determines whether the first source device and first destination device, if used for the job function, can satisfy a set of service level agreements (SLAS) for that job function based on: the network parameters along one or more data paths from the first source device to the first destination device, and the determined resources available on the first source device and/or first destination device. Subsequently, the system assigns the job function to the first source device if the network parameters suggest that the SLAs can be satisfied.

In a variation on this embodiment, the system communicates a set of ranges for the network parameters to at least one switch, and receives an alert when at least one network parameter on one or more links on a data path from the first source device to the first destination device falls out of the corresponding range.

In a variation on this embodiment, the system identifies a second source device and/or second destination device which can be used to perform the job function. The system further communicates information about the second source device and/or second destination device to one or more switches, and receives a second set of network parameters along a data path corresponding to the second source device and/or the second destination device.

In a further variation, the system determines a first assessment based on a sum of weighted relative performance parameters at different decision points along the data path from the first source device to the first destination device. The system also determines a second assessment based on a sum of weighted relative performance parameters at different decision points along the data path corresponding to the second source device and/or the second destination device. The system then compares the first assessment and second assessment.

In a variation on this embodiment, the set of network parameters comprise one or more of: an indication of congestion on a link, a number of inter-switch links between two switches on the data path, a number of virtual channels on an inter-switch link, the available bandwidth on a virtual channel on an inter-switch link, and a bandwidth utilization of a data path.

In a variation on this embodiment, determining resources available on the source device and/or the destination device involves determining one or more of: processor load, memory usage, available I/O bandwidth, and storage-medium access time.

In a variation on this embodiment, determining whether the source device and destination device can satisfy the set of SLAs involves determining a sum of weighted relative performance parameters at different decision points along the data path.

In a variation on this embodiment, the job function involves running a virtual server.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, application-specific integrated circuits (ASIC), field-programmable gate arrays (FPGA), volatile memory, non-volatile memory, magnetic and optical storage, or other media capable of storing computer-readable media now known or later developed.

Overview

Embodiments of the present invention facilitate a novel approach to workflow management based on network dynamics in an FC network. In conventional storage area networks, workflow management only applies to local machines. That is, the workload allocation on multiple machines in the network is performed only based on the local resources available on each machine. However, in a dynamic, heterogeneous network environment, the performance of an application depends on not only a respective machine's local resources, but also the availability of the network resources to satisfy SLAs required by the application.

Embodiments of the present invention allow a workload manager to estimate the performance of an application based on available local resources as well as network dynamics along a potential data path. This way, the workload in the network is balanced for the local resources as well as the network resources, which can significantly help the applications meet service-level agreements and improve network utilization.

Figure 1:
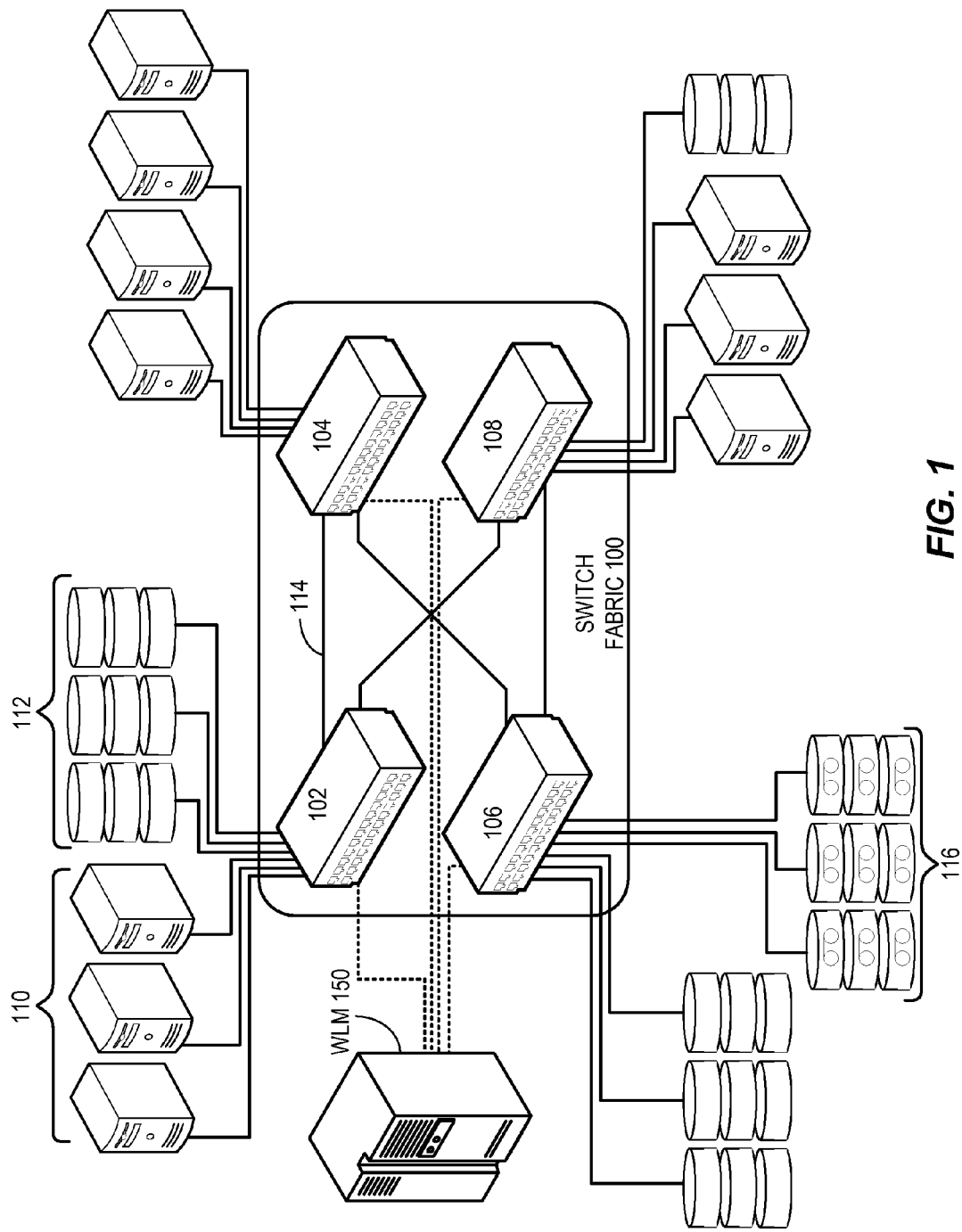
FIG. 1 illustrates an exemplary FC network that facilitates network-dynamics-based workload management, in accordance with an embodiment of the present invention.

FIG. 1 illustrates an exemplary FC network that facilitates network-dynamics-based workload management, in accordance with an embodiment of the present invention. In this example, an FC switch fabric 100 includes four switch modules, 102, 104, 106, and 108. A workload manager (WLM) 150 is in communication with these switch modules. Note that WLM 150 can be running on one of the servers in the FC network or on a separate, dedicated computer. Furthermore, a WLM can directly communicate with the switches. The WLM can also interface with a network management software which can communicate with one or more switches.

Each switch module is coupled to a group of network appliances. For example, switch module 102 is coupled to a number of servers 110 and a number of disk arrays 112. A respective network appliance can communicate with any appliance (referred to as "target") in the FC network.

For example, one of the servers 110 can transfer data to and from one of tape backup devices 116. Since the switch modules are not connected in a fully meshed topology, the data frames transferred between servers 110 and tape devices 116 traverse three switch modules 102, 104, and 106. In general, the switch modules are coupled by inter-switch links (ISLs), such as ISL 114.

As shown in the example in FIG. 1, large-port-count FC switch fabrics often include a number of smaller, interconnected individual switches. The internal connectivity of a switch fabric can be based on a variety of topologies. In this disclosure, the term "switch fabric" refers to a number of interconnected FC switch modules. The terms "switch module" and "switch" refer to an individual switch which can be connected to other switch modules to form a larger port-count switch fabric. The term "edge device" refers to any network appliance, either physical or logical, coupled to a switch.

A switch typically has two types of ports: fabric port (denoted as F_Port), which can couple to a network appliance, and extension port (E_Port), which can couple to another switch. A network appliance communicates with a switch through a host bus adaptor (HBA). The HBA provides the interface between an appliance's internal bus architecture and the external FC network. An HBA has at least one node port (N_Port), which couples to an F_Port on a switch through an optical transceiver and a fiber optic link. More details on FC network architecture, protocols, naming/address convention, and various standards are available in the documentation available from the NCITS/ANSI T11 committee (www.t11.org) and publicly available literature, such as "Designing Storage Area Networks," by Tom Clark, 2nd Ed., Addison Wesley, 2003, the disclosure of which is incorporated by reference in its entirety herein.

The heterogeneous nature of modern FC networks imposes new challenges. In conventional FC networks, the appliances are mostly for data storage or backup purposes and usually have similar QoS requirements and data-processing speeds. However, today's FC networks are often used for a variety of purposes, and the appliances in an FC network can have drastically different data-processing speeds and QoS requirements. It is possible to provision differentiated QoS classes on an FC physical link by dividing the bandwidth into logical channels (also referred to as "virtual channels). Different virtual channels can be grouped into different QoS classes, and can isolate the data frames transported therein. Furthermore, different QoS classes can be associated with a large range of entities at different hierarchies, e.g., physical machine, virtual machine, application, and sub-application message groups. Note that in this disclosure the term "QoS" or "quality of service" refers to an arbitrary set of service quality parameters. A QoS level or class can be based on an arbitrary number of metrics. For example, a given QoS level can specify a guaranteed or best-effort data rate. A more sophisticated QoS level can further specify other parameters, such as maximum delay and delay variation, maximum data frame loss rate, and maximum frame misdelivery rate.

As will be described in more detail in subsequent sections, WLM 150 collects information about the resources on the edge devices as well as information on the network dynamics, such as the availability and utilization of ISLs and congestion on virtual channels. Based on such information, WLM 150 can evaluate whether assigning a job on certain edge devices, e.g., running an instance of virtual server which accesses one of the disk drives, can meet the service-level agreements associated with that job. Note that the network dynamics information available to WLM 150 can include any network metrics measured by a switch. Such metrics can include, but are not limited to, link bandwidth and utilization, number of available virtual channels in a QoS class, degree of congestion for a virtual channel, and latency incurred to data frames. In one embodiment, the network dynamics information is measured by a switch module on its F_Ports or E_Ports and then reported to WLM 150. In other embodiments, the network dynamics information can be collected by the network management software connected to one or more switches and then reported to WLM 150. The following section describes in more detail how virtual channels can facilitate differentiated QoS in an FC network.

Virtual Channel and QoS

Conventionally, to prevent a target device from being overwhelmed with data frames, an FC network provides several flow control mechanisms based on a buffer credit system. A credit represents a device's ability to accept one frame. A sender maintains a transmission buffer, and transmits one frame from the buffer when a credit is received from the receiving device. In previous generations of FC switches, each outgoing link on a switch or HBA is associated with one buffer. This buffer is responsible for storing data frames from data flows. In this disclosure, the term "data flow" is loosely defined as the data frames flowing from a source entity to a destination entity. In one embodiment, the source can be identified by a source ID (S_ID), and a destination can be identified by a destination ID (D_ID). In conventional FC networks, the source ID refers to the outgoing port on the source HBA, and the destination ID refers to the incoming port on the destination HBA. In this disclosure, however, a source or destination ID can be associated with a wide range of logical entities, including a physical appliance (e.g., a physical server) to which an HBA belongs, a virtual appliance, an application, or a sub-application message group.

One problem associated with the conventional buffer configuration is that it is very difficult to provide different QoS to different data flows when these data flows are transported on a common link. For example, a low-priority data flow may travel on a common link with a high-priority data flow. The data frames from these two flows are mingled in the common buffer, which makes provisioning of differentiated QoS difficult.

One way to solve this problem is to divide the bandwidth in a link into logical channels and serve each logical channel with a separate buffer. This way, data flows of different priorities can be assigned to different logical channels and, since each logical channel has a separate buffer, the data flows can be sufficiently isolated from each other. Furthermore, a switch can provision different QoS levels to the logical channels by using various buffer scheduling schemes. For example, the switch can allocate different guaranteed or best-effort data rates to different logical channels or groups of logical channels by using a weighted round-robin scheme when retrieving and transmitting data frames stored in the different buffers.

In one embodiment, such logical channels are referred to as "virtual channels" or "VCs." More implementation details of virtual channels are disclosed in U.S. Pat. No. 7,239,641, entitled "Quality of Service Using Virtual Channel Translation" by Banks, et al., and "Virtual Channels for Switched Fabric" by Martin, et al., available at www.t10.org/ftp/t11/document.04/04-093v0.pdf, the disclosures of which are incorporated by reference herein in their entirety.

Note that the virtual channel in FC networks should be distinguished from the "virtual circuit" (which is sometimes also called "virtual channel") in ATM networks. An ATM virtual circuit is an end-to-end data path with a deterministic routing from the source to the destination. That is, in an ATM network, once the virtual circuit for an ATM cell is determined, the entire route throughout the ATM network is also determined. More detailed discussion on ATM virtual circuits can be found in "Computer Networks," Section 5.6, by A. S. Tanenbaum, 3rd Ed., Prentice-Hall, 1996.

In contrast, an FC virtual channel is a local logical channel on a physical link, between two switches or between a switch and an HBA. That is, an FC virtual channel only spans over a single link, whereas an ATM virtual circuit spans from the source to the destination over multiple links. Furthermore, an FC virtual channel carries FC data frames, which are of variable length. An ATM virtual circuit, however, carries ATM cells, which are of fixed length.

Figure 2:
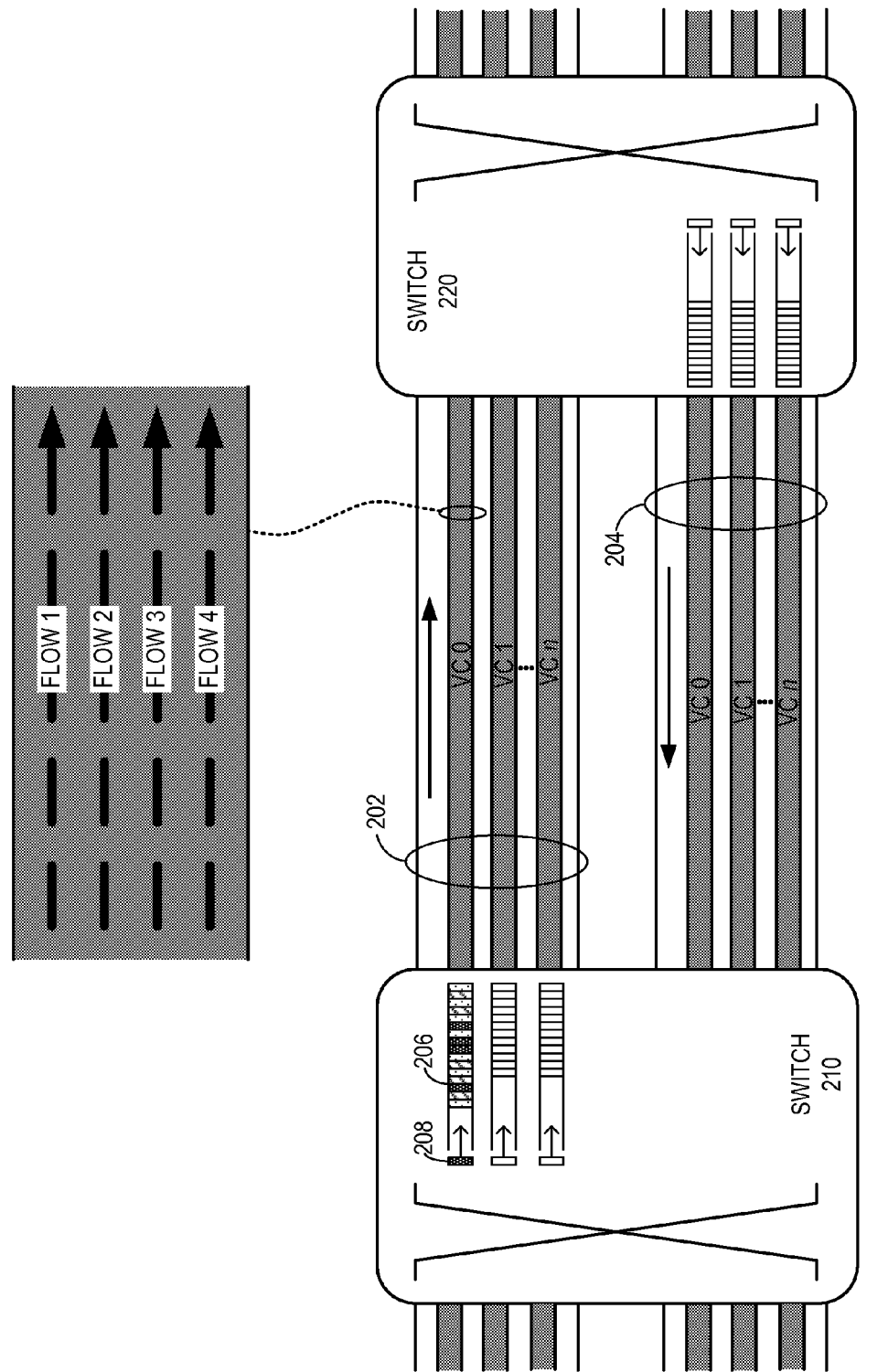
FIG. 2 illustrates exemplary virtual channels and data flows, in accordance with an embodiment of the present invention.

FIG. 2 illustrates exemplary virtual channels and data flows, in accordance with an embodiment of the present invention. In this example, a switch 210 is coupled to a switch 220 by an outgoing physical link 202 and an incoming physical link 204. Each physical link is divided into a number of virtual channels. For example, link 202 is divided into virtual channels VC 0, VC 1, ..., VC n. A respective virtual channel is associated with a buffer dedicated to that virtual channel. Furthermore, a buffer may store data frames from a number of data flows. Correspondingly, a virtual channel can carry multiple data flows.

For example, VC 0 on link 202 is associated with a transmission buffer 206 in switch 210. Buffer 206 stores data frames from multiple data flows, such as data frame 208. Note that in FIG. 2 different frames of different data flows in buffer 206 are presented with different fill patterns. FIG. 2 also illustrates a zoomed-in view of the content of VC 0 on link 202. Here VC 0 of link 202 carries four data flows, FLOW 1, 2, 3, and 4. These flows may correspond to the same source and destination or to a different source and destination. In other words, although these flows share the same virtual channel on link 202, they might belong to different end-to-end routes. This is an important distinction between FC virtual channels and ATM virtual circuits, because all the data cells in an ATM virtual circuit belong to the same source/destination pair.

In one embodiment, the VCs on a link can be assigned to different QoS levels, and the switch can schedule transmission from their respective buffers accordingly. For example, among all the VCs on a link, some VCs may have guaranteed bandwidth, wherein the switch periodically serves the buffer associated with these VCs to guarantee a minimum data rate. Other VCs may be assigned different weights and may participate in a weighted round-robin scheme when transmitting frames from their respective buffers. Note that a variety of buffer-scheduling schemes can be used to achieve different QoS results.

Figure 3:
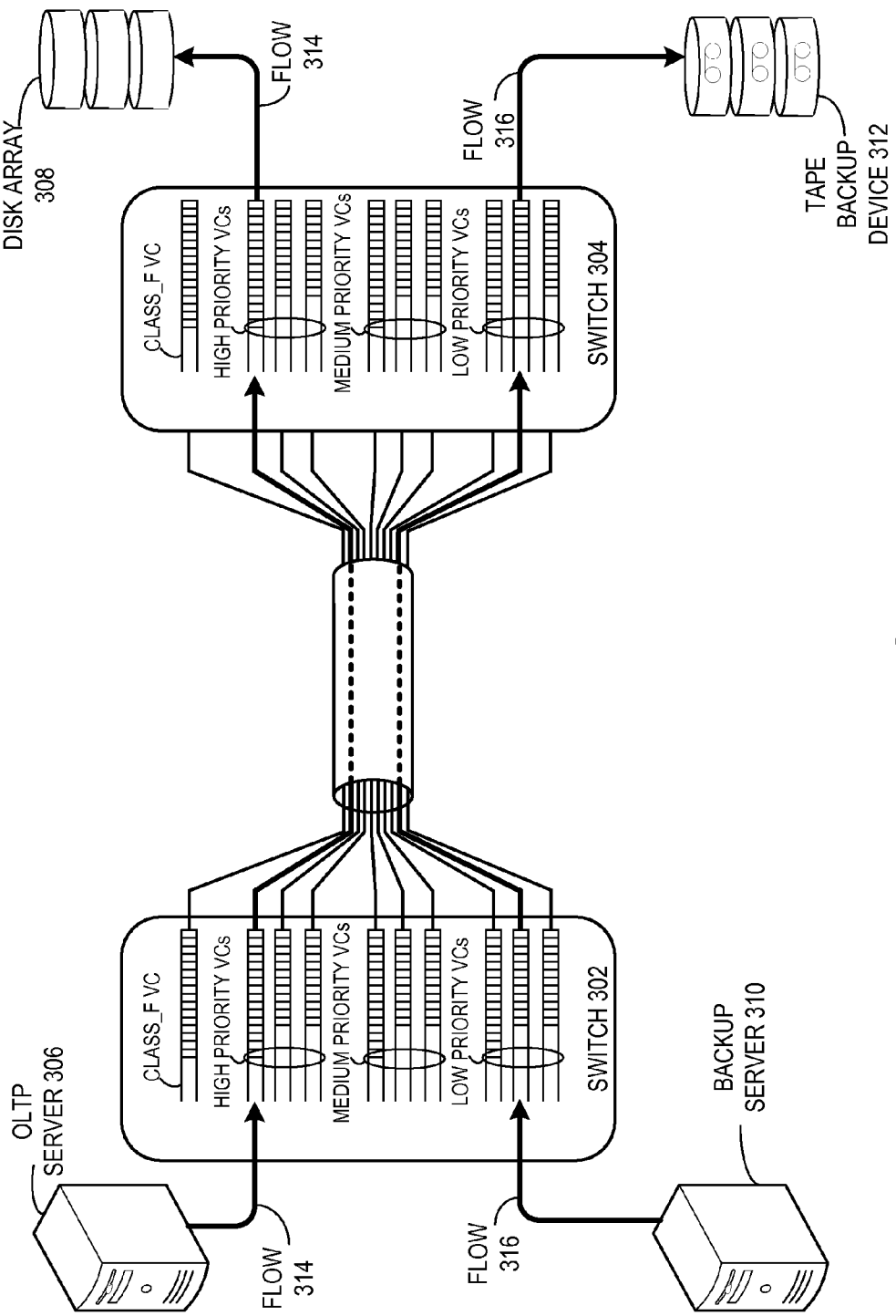
FIG. 3 illustrates an example of providing different QoS to different data flows in an FC switch fabric, in accordance with an embodiment of the present invention.

FIG. 3 illustrates an example of providing different QoS to different data flows in an FC switch fabric, in accordance with an embodiment of the present invention. In this example, the physical link between switches 302 and 304 contains a number of VCs. These VCs are grouped into several QoS classes: Class_F, high priority, medium priority, and low priority. The Class_F VC corresponds to the Class_F traffic as defined in the FC standards and carries critical network control and management traffic. In one embodiment, the Class_F VC (or VCs) is served with a strict-priority scheduling scheme. The other three QoS classes can use a weighted round-robin scheduling scheme. In one embodiment, a respective VC in the high, medium, and low QoS classes is assigned a relative weight.

In the example in FIG. 3, a data flow 314 is originated from an online transaction processing (OLTP) server 306 and destined for a disk array 308. Flow 314 carries mission-critical transaction data, and therefore is assigned to a VC with high priority. Meanwhile, a second data flow 316 is carried on the same physical link. Data flow 316 is between a backup server 310 and a tape backup device 312. Since data backup usually occurs in the middle of the night and is not time-sensitive, flow 316 is assigned to a VC with a low priority. Since each VC has a separate buffer, flows 314 and 316 can be transported on the same physical link independent from each other. In other words, even if tape backup device 312 is slow in processing data frames, data frames from flow 316 do not interfere with the data transfer of flow 314.

During operation, data flows in different VCs may experience different network performance, because the congestion situation in each buffer can be different. For example, some VCs may incur longer latency to the data frames due to oversubscription or head-of-queue blocking caused by some slow data flows. Such network dynamics are important to the workload manager when it is trying to determine how to assign jobs to edge devices, because the service a job receives depends on local resources at the edge devices as well as the network performance.

Workload Management

Generally, workload management involves allocating resources to various types of workload based on predefined policies. Workload management is conventionally used in mainframe computing environments. The proliferation of server virtualization has added a new dimension to the constant need of workload management in the data centers. However, conventional workload-management approaches do not adequately account for the impact of network on the service-level agreements. Embodiments of the present invention provide a new generation of workload managers that can use the information about the network when making workload-related decisions.

A service-level agreement (SLA) is a formal agreement between a business objective of a job function running on a server and all the resources, including server resource, storage resource, network capacity, etc., that are required to complete the job. The resources involved are expected to provide a certain level of confidence that the business objective will be met under predefined conditions. There may be different SLAs for different functions/jobs associated with the same application. Typically, the degree to which an SLA for a business objective is satisfied is a function of resource availability:

$$SLA_{BusinessObjective} = f(\text{Resource Availability}).$$

Figure 4:
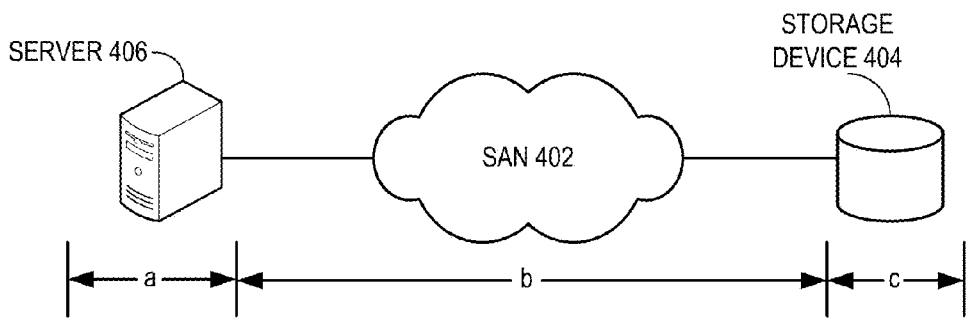
FIG. 4 illustrates different decision domains in an FC network that can affect workload management, in accordance with an embodiment of the present invention.

Generally, almost all SLAs could be defined in terms of time, since the non-availability of any resource could impact the completion time of a job and consequently the business objective. From an application's perspective, time to complete a job that spans the server, network, and storage elements is an arithmetic sum of time spent in each segment. For example, as illustrated in FIG. 4, the time to complete a job may include the time consumption attributable to a server 406, a SAN 402, and a storage device 404. These three decision domains are denoted as a, b, and c, respectively. Hence, the time required to complete a given job can be expressed as:

$$\text{Time}_{job} = t(a) + t(b) + t(c);$$

wherein t(a), t(b), and t(c) denote the time consumed to complete the job in decision domains a, b, and c, respectively. Correspondingly, the degree to which an SLA for the job is satisfied is a function of the time required to complete the job:

$$SLA_{job} = f(\text{Time}_{job}).$$

In other words, the non-availability of resources, such as lack of computing power, insufficient memory on a server, or congestion in the network, can impact the satisfaction of a job's SLA.

Note that the term "decision domain" refers to a group of equipment that can consume time to complete a given job. Without losing generality, a decision domain can be defined to include source devices, network equipment, or target devices.

Conventional workload management systems associate workload with parameters corresponding to a server's resources. The degree of SLA satisfaction is related with computing power and available memory. For example, VMWare's Distributed Resource Scheduler (DRS)® can dynamically allocate and balance computing capacity across a collection of hardware. Similarly, ORACLE's Resource Manager® can allocate computing power and memory to database functions based on predefined policies that are associated with the SLAs. In general, conventional WLM functions consider computing power and memory capacity as the primary means for satisfying SLAs:

$$SLB_{BusinessObjective} = f(\text{computing power, memory}).$$

Conventional WLMs concentrate on the application or server side of the equation. Almost all decisions are made based on the parameters/conditions prevalent at the server end. Generally, certain amount of computing power and memory are associated with a job and priorities are assigned to jobs. In case of contention for these resources, the jobs with higher priority receive the server resources, because high-priority jobs have higher SLA requirements compared with low-priority jobs (although the scheduling algorithm may vary between WLM implementations). In some instances, for example in VMWare's DRS®, the WLM can re-allocate jobs across different server platforms so as to provide an optimal computing environment for the applications, which can be virtual machines.

Figure 5A:
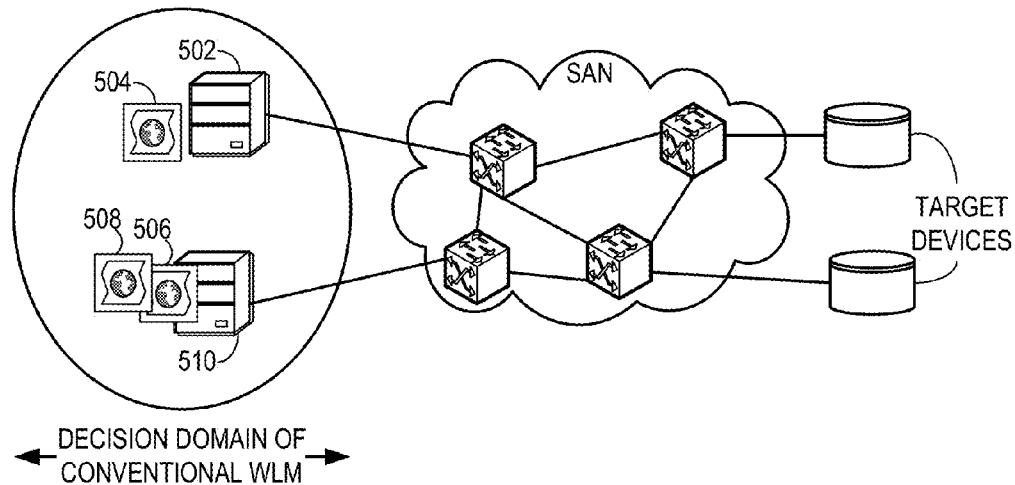
FIG. 5A illustrates the decision domain of a conventional workload manager.

Unfortunately, the problem is not that simple in real life. In a modern SAN, a job can involve multiple entities, including a server, network switches, and target devices. Throwing CPU time and more memory at the problem is not the answer, because the server may have adequate processing power and available memory but the data path in the network may be the bottleneck. FIG. 5A illustrates the decision domain of a conventional workload manager. In this example, two servers, 502 and 510, are coupled to a SAN. Virtual machine 504 runs on server 502, and virtual machines 506 and 508 run on server 510. When allocating resources to different jobs, such as virtual machines 504, 506, and 508, a conventional WLM only considers the parameters for servers 502 and 510. However, the SAN and target devices can significantly slow down a job if resources in these domains are not allocated efficiently.

The main drawback of the conventional WLM model is that it ignores t(b) and t(c). Therefore, even if resources are available at the server end to perform a specific job function, network constraints such as congestion could cause an SLA to fail. Even if the network is infinitely fast, a slow target device, such as a storage device, could cause back-pressuring or buildup in the switch fabric (e.g., buffer-to-buffer credit back pressuring in FC networks or per-priority pause in Distributed Computing Environment (DCE) networks), which can impact both t(b) and t(c).

Furthermore, the current industry trends are causing factors which contribute to a network's load to change at a faster pace than in conventional systems. For example, modern FC networks have large fabrics interconnecting many servers, network elements, and storages. Many applications exhibit complex behavior when interacting with storage devices. In addition, the server virtualization is bringing unprecedented mobility to applications, wherein virtual servers often share physical network resources.

Figure 5B:
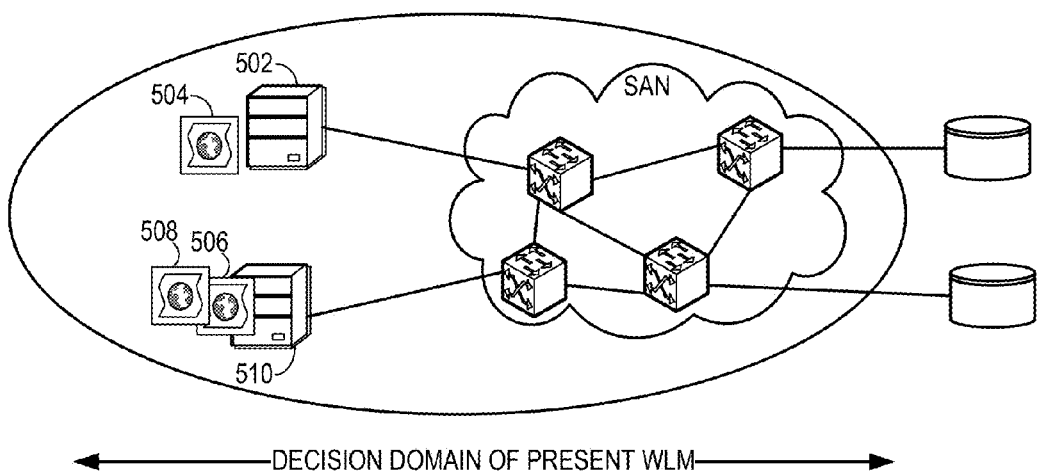
FIG. 5B illustrates the decision domain of a novel workload manager, in accordance with an embodiment of the present invention.

Clearly, the static (e.g., physical network capacity) and dynamic (e.g., load) conditions along a data path could impact the SLA between servers and storage devices. As illustrated in FIG. 5B, embodiments of the present invention provide a WLM that accounts for conditions prevalent within the network as well as within the server when making resource-allocation decisions. That is, the WLM's decision domain can cover both server parameters and network parameters. For example, if a network path is congested beyond acceptable limits, the WLM may decide to take corrective actions such as moving a job to another computing node where the data path is not congested.

Figure 5C:
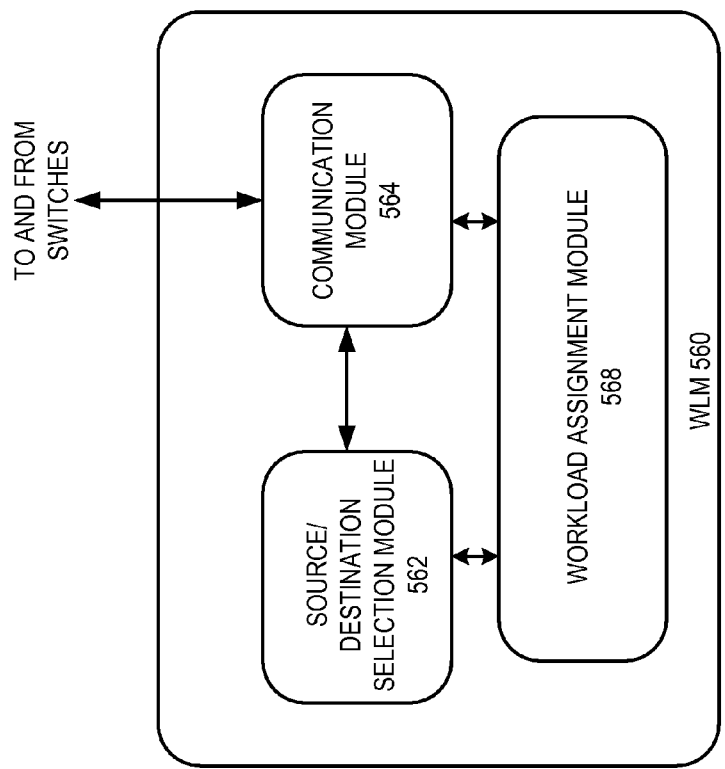
FIG. 5C illustrates an exemplary architecture of a workload manager, in accordance with an embodiment of the present invention.

FIG. 5C illustrates an exemplary architecture of a workload manager, in accordance with an embodiment of the present invention. A WLM 560 includes a source/destination selection module 562, a communication module 564, and a workload assignment module 568. When WLM 560 attempts to assign a job in the network, source/destination selection module 562 first identifies a source/destination pair which can run the job. Communication module 564 then communicates the address information of this source/destination pair to the network equipment. In response, communication module 564 receives network dynamics parameters for a data path corresponding to the source/destination pair. Based on the received network dynamics information, workload assignment module 568 can determine whether the identified source/destination pair can satisfy the SLA for the job.

In the context of a SAN, a network provides a communication channel for the server applications to communicate with the storage elements. In a SAN, SLAs typically define the expectation that a server application imposes on its access to the data stored in the storage elements across the network. Communication between servers and storage elements follow data paths in the network that are defined by the routing protocols. In some embodiments of the present invention, a WLM can use network dynamics information to create, move, or monitor jobs. Note that although in this disclosure the new WLM approaches are described in the context of server virtualization, the principles are equally applicable in non-virtualized environments.

In the case of job creation, a new job such as a virtual machine, say VM_new, is to be created on a server platform. Assume that there is more than one server available on which VM_new can be installed. After being installed, VM_new needs to communicate with a storage element. The example in FIG. 1 includes two storage elements, SE1 and SE2, and two servers, S1 and S2, which can host VM_new. Furthermore, assume that each server has the processing power to host VM_new. If the data path from S1→SE1 is different from S2→SE2, then the conditions on one data path compared with the other can help the WLM decide the placement of VM_new. For instance, if path S1→SE1 is showing congestion in comparison with S2→SE2 (assuming that all other parameters remain the same), then it might be beneficial to place VM_new on S2, if data path S2→SE2 meets VM_new's bandwidth and SLA requirements.

In the case of job migration, a job is moved from one physical server to another. There can be many reasons for such migration. For example, the WLM may migrate a job for energy savings, or when high-performance hardware becomes available. Server virtualization facilitates the migration of virtual machines from one server to another. When an existing virtual machine is to be migrated to a different server for any reason (server upgrade, power saving, etc.), an insight into network dynamics can help the WLM select a new server whose network path to the storage device is better compared with the others to satisfy the SLAs of the application hosted by the virtual machine. Furthermore, the networks dynamics information can also help the WLM to validate the SLA requirements of a previously selected server.

In the case of job monitoring, a WLM monitors the jobs (e.g., virtual machines) that are running on the servers and communicating with the storage elements. In one embodiment, the WLM constantly monitors the resource status of servers and associated network resources. Depending on the interaction between the devices connected to the network, various network paths will exhibit different type of dynamics.

The network dynamics information can include varying degree of congestion, the number of inter-switch links between two switches, the number of virtual channels on an inter-switch link, the available bandwidth on a virtual channel on an inter-switch link, and the bandwidth utilization of a data path.

If one or more dynamic parameters (e.g., degree of congestion) exceed reasonable bounds, they could impact the SLAs for a job. Generally, an unexpected change in network dynamics could result from many factors. For example, during the holiday season, the increased number of sales at an online retailer can cause a surge in the load on a server farm. In another example, quarter-end financial computations can significantly increase the data-processing workload across a network. Furthermore, network equipment failure, such as fiber cuts and equipment or power outage, can result in disruptions to the network.

In these events, it is usually possible to redistribute the jobs to attain better network utilization and to help sustain the SLAs. In one embodiment, a WLM can monitor the network dynamics by constantly polling information from the switches and make job relocation decisions based on this information. The switches can collect the network dynamics information using a variety of methods, such as the methods taught in U.S. patent application Ser. No. 11/782,894, entitled "Method and Apparatus for Determining Bandwidth-Consuming Frame Flows in a Network," by inventor Amit Kanda, filed 25 Jul. 2007.

WLM Implementation Model

There are many ways in which a WLM can interact with the network equipment for the stated purpose. For an FC network, the WLM can send pre-negotiated vendor-specific Extended Link Service (ELS) commands or vendor-specific command codes for services to Well Known Addresses (WKAs) defined in the FC protocol (e.g., Management Server) to communicate with the FC switches. The WLM can also interact with the network management software which is in communication with one or more switches in the network. In embodiments of the present invention, the WLM can adopt three implementation models to facilitate workload management based on network dynamics: connection model, alarm model, and comparison model.

Connection Model

In the connection model, the WLM provides the path information, e.g., source/destination pair, to the network equipment by specifying the source and destination network addresses. In response, the network equipment (e.g., one or more switches) provides the network dynamics report, which contains information such as physical bandwidth, statistical bandwidth utilization, statistical congestion levels, flow statistics, etc., for the links and switches along the routed path from the source to the destination.

For example, in an FC network, the WLM running on a server can request network dynamics information using the following address format for the source/destination pair:
  World-wide name: (Source_WWN, Destination_WWN)
  FC address: (Source_FC_Address, Destination_FC_Address)
  Domain and port name: (Source(Domain, Port), Destination(Domain, Port)).

As a result, the network equipment determines the data path from the source to the destination and provides relevant network dynamics data associated with that path.

Alarm Model

In the alarm model, the WLM provides information about the data path of interest to the network equipment and the acceptable bounds for various network dynamics parameters. The network equipment constantly monitors the parameter against the requested levels. If any of the parameters exceeds the bounds, the corresponding network equipment (e.g., a switch) can send an alarm to the WLM. The WLM can then react to the alarm by, for example, reallocating the workload.

Comparison Model

In the comparison model, the WLM provides information about multiple source/destination pairs to the network equipment and requests the network dynamics information for the corresponding data paths. Based on the received information and information about the source and destination, the WLM can evaluate data-path dynamics for all potential source/destination pairs. In some embodiments, the network equipment can perform an assessment of the network dynamics parameters for different data paths and provide an evaluation result to the WLM. Note that different data paths for comparison may share a common source or a common destination. That is, two candidate data paths may have the same source but different destinations. Similarly, two candidate data paths may have different sources but the same destination. A third scenario is that two candidate data paths may have different sources and different destinations.

For example, the WLM can request evaluation for data paths between the following source/destination pairs
  Path1 (FC_address1, FC_Address2)
  Path2 (Source (domain, port), Dest(domain, port))
  Path3 (Source(domain, port), Destination_WWN)

In one embodiment, the WLM or network equipment can perform an analysis on the relative merits of different data paths based on some mathematical model, such as the one described below, and provide the assessment of each data path in the form of a relative percentile:
  Path1: 81%
  Path2: 23%
  Path3: 100%.

The above assessment means that if the performance of Path3 is considered to satisfy a set of SLAs 100%, then relatively Path1 has 81% probability and Path2 has 23% probability of satisfying the SLAs.

Figure 6:
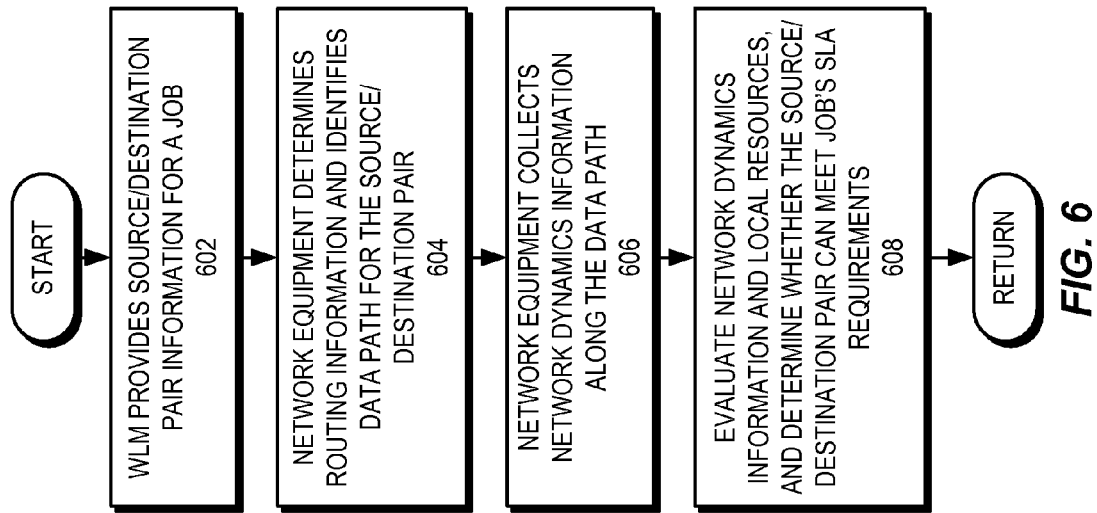
FIG. 6 presents a flowchart illustrating the process of managing workload based on network dynamics in an FC network, in accordance with an embodiment of the present invention.

FIG. 6 presents a flowchart illustrating the process of managing workload based on network dynamics in an FC network using the comparison model, in accordance with an embodiment of the present invention. During operation, a WLM provides a source/destination pair information for a job to the network equipment, such as FC switches, in the network (operation 602). The network equipment then determines the routing information and identifies a data path for the source/destination pair (operation 604). Subsequently, the network equipment collects the network dynamics information along the data path (operation 606). Next, a network entity or the WLM evaluates the network dynamics information and the local resources, and determines whether the source/destination pair can meet the job's SLA requirements (operation 608).

In summary, the WLM provides the network with the source/destination pair information (note that in certain cases the source or destination device many not be present). If it is a job-creation case, the WLM may also benefit from providing additional information regarding the possible SLA requirements, such as network bandwidth requirement, latency requirement, etc.

The network equipment then collects the static information about the switch fabric, for example topology, switch types, blades in each switch, free ports in each blade, etc. The network equipment further determines the possible route for the source/destination pair and collects information from network elements along the routed path. Information on the dynamic network behavior is collected over a period of time. Such dynamic information includes bandwidth utilization statistics at various points in the network (e.g., F_Ports and E_Ports), congestion at E_ports or at VC levels, flow load factor at physical link or QoS levels, flow congestion analysis, etc. A network entity or WLM can then use a weighted formula to perform relative path analysis.

Weighted Formula

Technically, a job could be associated with any available server in the network. When determining how to allocate a job, the WLM can consider the following factors:

- The degree to which the job's communication requirements are satisfied by running the job on a server coupled to different free points in the network.
- The degree to which the job's communication pattern impacts the existing dynamics of the network, e.g., impact on unrelated flows.

In practice, there may be many decision points based on the data collected that could help differentiate one data path from another. A weighted scheme could be used to assign weights to each decision point for every candidate server based on the desired and available network resources. The weights of all decision points are then aggregated and the port (assuming that the server is connected to a port in the SAN network) with the maximum points become the recommended server to run the job. In one embodiment, the relative assessment of a port on a switch can be expressed as follows:

Relative Assessment=Σweighted Decision Points

Figure 7:
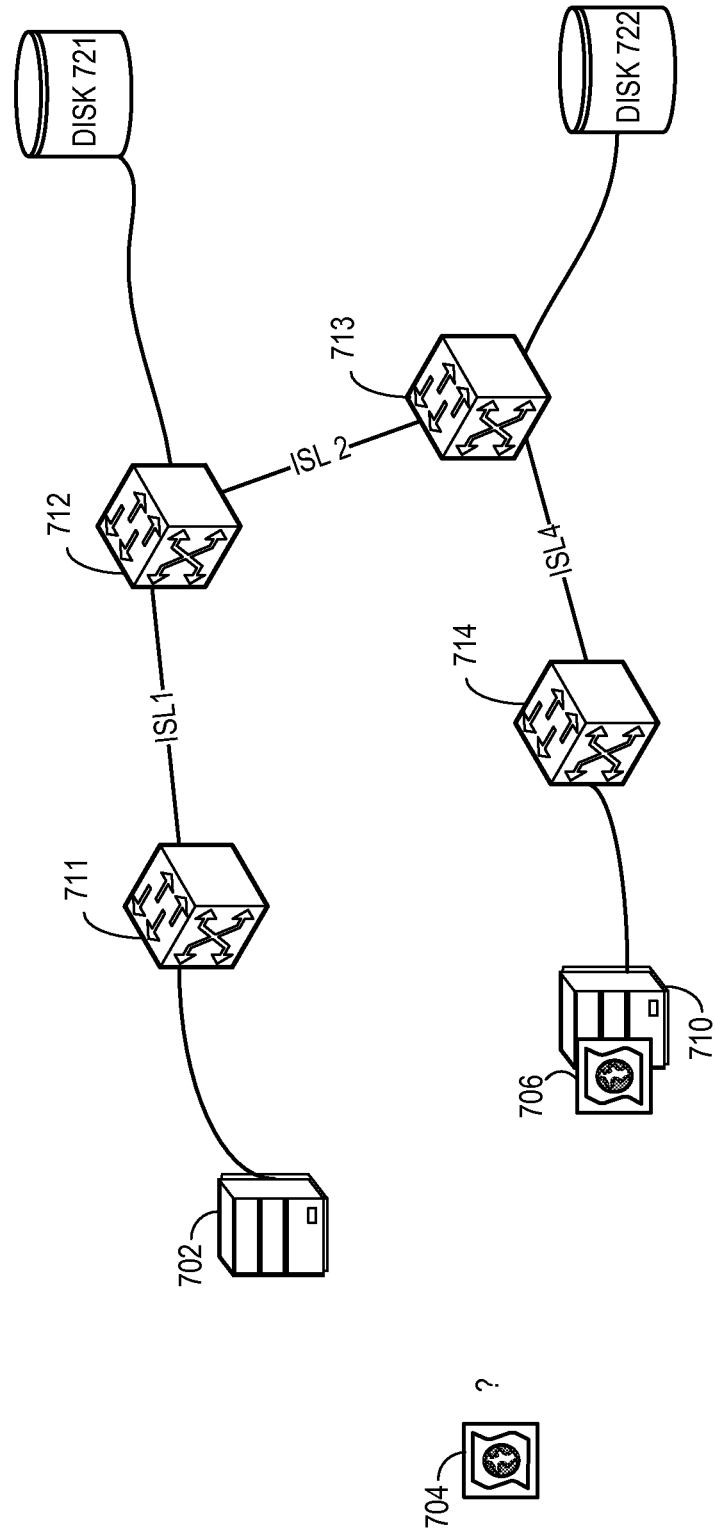
FIG. 7 illustrates an example of workload management based on network dynamics, in accordance with an embodiment of the present invention.

FIG. 7 illustrates an example of workload management based on network dynamics, in accordance with an embodiment of the present invention. In this example, the network includes four switches, 711, 712, 713, and 714, which are connected with three inter-switch links ISL1, ISL2, and ISL4. A disk 721 is attached to switch 712, and disk 722 is attached to switch 713. A server 710 is attached to switch 714, and server 702 is attached to switch 711. Furthermore, a job 706 is running on switch 714. Assume that the data for job 706, which flows from server 710 to disk 721, is write data which uses a large amount of bandwidth on ISL4 and ISL2. Also, assume that disk 721 is relatively slow and is causing congestion on ISL2 and ISL4 in the direction toward disk 721. Server 702 is attached to switch 711 but is not running any job.

A new job 704 is to be assigned to server 702 or 710. Job 704 involves communication between one of the servers and disk 722, and requires a certain amount of I/O bandwidth to communicate with disk 722. In one embodiment, the WLM could send the device pair information to a network entity, which can be a switch or a separate server. The network entity can then perform analysis of possible data paths and send the response back to the WLM. In this example, there are two possible data paths: server 714→switch 714→switch 713→disk 722, and server 702→switch 711→switch 712→switch 713→disk 722. Table 1 presents a set of exemplary analysis results for these two data paths.

TABLE 1

| | Candidate Network Ports | |
|---|---|---|
| Decision Points | SERVER 710 (weight out of 10) | SERVER 702 (weight out of 10) |
| Requested I/O Match | 5 (Job 706 on server 710 is communicating with Disk 721, so the available bandwidth is I/O capacity of ISL4-I/O capacity used for Job 706 → Disk 721) | 10 (All bandwidth available) |
| Congestion on path from server to target (Disk 722) | 4 (based on the amount of congestion) | 10 (no congestion) |
| Number of ISLs along the data path (also consider ISL speed) | 10 (1 ISL along the path) | 5 (2 ISLs along the path) |
| Existing data path bandwidth utilization | 2 (Path is already in use and the available bandwidth is less than the maximum capability of Server 710 → Disk 722) | 10 (Path is free) |
| TOTAL | 21 | 35 |
| Percentage Adjusted | 60% | 100% |

In this example, the data path starting from server 702 has more favorable network parameters than the data path starting from server 710, except for the number of ISLs along the path. More specifically, the I/O bandwidth available at server 710 is much less than that at server 702. Also, the data path from server 710 suffers more congestion because of the existing data flow for job 706 from server 710 to disk 721. Furthermore, the existing data path from server 706 to disk 721 has a high utilization, which results in less available bandwidth.

When assessing these two data paths, the network entity assigns a relative weight to each decision point and then computes a sum of all the weights. The highest cumulative weight is then used as a reference (100%), which in one embodiment represents the best-effort SLA satisfaction. The cumulative weight of other data paths are then used to compute a percentage. In the example illustrated in FIG. 7, server 711 is a better candidate for assigning job 704 based on the assessment.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:
   determining a set of network parameters for one or more switches along a first data path from a first source device to a first destination device, wherein at least one of the parameters indicates congestion condition on a link within the first data path;
   determining resources available on the first source device;
   determining whether assigning a job function to the first source device satisfies a service level agreement, based on:
   the determined network parameters; and
   the determined resources available on the first source device; and in response to determining that the service level agreement is satisfied, assigning the job function to the first source device; and in response to determining that the service level agreement is not satisfied, precluding the job function from being assigned to the first source device.

2. The method of claim 1, further comprising:
identifying an alert message indicating at least one network parameter associated with the first data path has fallen out of a predetermined range.

3. The method of claim 1, further comprising:
determining a second set of network parameters for one or more switches along a second data path corresponding to a second source device.

4. The method of claim 3, further comprising:
determining a first assessment based on a sum of weighted relative performance parameters associated with the first data path;
determining a second assessment based on a sum of weighted relative performance parameters associated with the second data path; and
comparing the first assessment and second assessment.

5. The method of claim 1, wherein the set of network parameters comprises one or more of:
a number of links between two switches on the data path;
a number of virtual channels on a link;
available bandwidth on a virtual channel; and
a bandwidth utilization of a data path.

6. The method of claim 1, wherein determining resources available on the first source device comprises determining one or more of:
processor load;
memory usage;
available I/O bandwidth; and
storage-medium access time.

7. The method of claim 1, wherein determining whether the service level agreement is satisfied comprises determining a sum of weighted relative performance parameters along the first data path.

8. The method of claim 1, wherein the job function involves running a virtual server.

9. A computing device, comprising:
a parameter determination module adapted to determine a set of network parameters for one or more switches along a first data path from a first source device to a first destination device, wherein at least one of the parameters indicates congestion condition on a link within the first data path;
a resource determination module adapted to:
determine resources available on the first source device; and
determine whether assigning a job function to the first source device satisfies a service level agreement, based on:
the determined network parameters; and
the determined resources available on the first source device; and
a job-assignment module adapted to:
assign the job function to the first source device in response to determining that the service level agreement is satisfied; and
preclude the job function from being assigned to the first source device in response to determining that the service level agreement is not satisfied.

10. The computing device of claim 9, wherein the parameter determination module is further adapted to identify an alert message indicating at least one network parameter on one or more links on the first data path has fallen out of a predetermined range.

11. The computing device of claim 9, wherein the parameter determination module is further adapted to determine a second set of network parameters for one or more switches along a second data path corresponding to a second source device.

12. The computing device of claim 11, wherein the resource determination module is further adapted to:
determine a first assessment based on a sum of weighted relative performance parameters associated with the first data path;
determine a second assessment based on a sum of weighted relative performance parameters associated with the second data path; and
compare the first assessment and second assessment.

13. The computing device of claim 9, wherein the set of network parameters comprises one or more of:
a number of links between two switches on the data path;
a number of virtual channels on a link;
available bandwidth on a virtual channel; and
a bandwidth utilization of a data path.

14. The computing device of claim 9, wherein while determining resources available on the first source device, the resource determination module is adapted to determine one or more of:
processor load;
memory usage;
available I/O bandwidth; and
storage-medium access time.

15. The computing device of claim 9, wherein while determining whether the service level agreement can be is satisfied, the resource determination module is adapted to determine a sum of weighted relative performance parameters along the first data path.

16. The computing device of claim 9, wherein the job function involves running a virtual server.

17. A non-transitory computer-readable medium storing instructions which when executed by a computer cause the computer to perform a method, the method comprising:
determining a set of network parameters for one or more switches along a first data path from a first source device to a first destination device, wherein at least one of the parameters indicates congestion condition on a link within the first data path;
determining resources available on the first source device;
determining whether assigning a job function to the first source device satisfies a service level agreement, based on:
the determined network parameters; and
the determined resources available on the first source device; and
in response to determining that the service level agreement is satisfied, assigning the job function to the first source device; and
in response to determining that the service level agreement is not satisfied, precluding the job function from being assigned to the first source device.

18. The computer-readable medium of claim 17, wherein the method further comprises identifying an alert message indicating at least one network parameter associated with the first data path has fallen out of a predetermined range.

19. The computer-readable medium of claim 17, wherein the method further comprises determining a second set of network parameters for one or more switches along a second data path corresponding to a second source device.

20. The computer-readable medium of claim 19, wherein the method further comprises:
- determining a first assessment based on a sum of weighted relative performance parameters associated with the first data path;
- determining a second assessment based on a sum of weighted relative performance parameters associated with the second data path; and
- comparing the first assessment and second assessment.

21. The computer-readable medium of claim 17, wherein the set of network parameters comprises one or more of:
- a number of links between two switches on the data path;
- a number of virtual channels on a link;
- available bandwidth on a virtual channel; and
- a bandwidth utilization of a data path.

22. The computer-readable medium of claim 17, wherein determining resources available on the first source device comprises determining one or more of:
- processor load;
- memory usage;
- available I/O bandwidth; and
- storage-medium access time.

23. The computer-readable medium of claim 17, wherein determining whether the service level agreement is satisfied comprises determining a sum of weighted relative performance parameters along the first data path.

24. The computer-readable medium of claim 17, wherein the job function involves running a virtual server.

* * * * *